United States Patent
White (10) Patent No.: US 11,731,091 B1
(45) Date of Patent: Aug. 22, 2023

(54) BLENDER TOOL

(71) Applicant: Adaptive Creations Group, Inc., Sarasota, FL (US)

(72) Inventor: Steven N. White, Sarasota, FL (US)

(73) Assignee: ADAPTIVE CREATIONS GROUP, INC., Sarasota, FL (US)

( * ) Notice: Subject to any disclaimer, the term of this patent is extended or adjusted under 35 U.S.C. 154(b) by 203 days.

(21) Appl. No.: 17/104,217

(22) Filed: Nov. 25, 2020

Related U.S. Application Data (60) Provisional application No. 62/960,264, filed on Jan. 13, 2020.

(51) Int. Cl.
| | |
|---|---|
| *B01F 27/41* | (2022.01) |
| *B01F 27/90* | (2022.01) |
| *A47J 43/07* | (2006.01) |
| *A47J 43/08* | (2006.01) |
| *B01F 101/00* | (2022.01) |

(52) U.S. Cl.
CPC .............. *B01F 27/41* (2022.01); *A47J 43/0711* (2013.01); *A47J 43/0722* (2013.01); *A47J 43/087* (2013.01); *B01F 27/90* (2022.01); *B01F 2101/1805* (2022.01)

(58) Field of Classification Search
CPC .......... A47J 43/087; B01F 27/41; B01F 27/90; B01F 2101/1805; A47J 43/0722; A47J 43/0711; A47J 43/0716; A47J 43/042; A47J 43/046; A47J 43/27; A47J 43/28; A47J 43/288; A47J 43/044
See application file for complete search history.

(56) References Cited

U.S. PATENT DOCUMENTS

| | | | | |
|---|---|---|---|---|
| 5,533,805 | A | * | 7/1996 | Mandel .............. B01F 35/3204 366/285 |
| 5,613,425 | A | * | 3/1997 | Krznaric .............. A47J 36/165 366/279 |
| D666,056 | S | | 8/2012 | Boozer et al. |
| 10,201,790 | B2 | | 2/2019 | Hoare et al. |
| 2007/0041268 | A1 | * | 2/2007 | Beesley et al. ..... A47J 43/0716 366/195 |
| 2014/0133263 | A1 | | 5/2014 | Schneider |
| 2019/0117005 | A1 | | 4/2019 | Kettavong et al. |
| 2019/0142221 | A1 | | 5/2019 | Miller et al. |

FOREIGN PATENT DOCUMENTS

EP 3517002 A1 7/2019

OTHER PUBLICATIONS https://www.tradekey.com/product-free/Universal-Blender-Tamper-Plunger-Blending-Stir-Stick-Adjustable-8121119.html.

* cited by examiner

*Primary Examiner* — Elizabeth Insler
(74) *Attorney, Agent, or Firm* — Frijouf, Rust & Pyle, P.A.

(57) ABSTRACT

A blender tool is disclosed for assisting in blending a substance within a blender. The blending tool comprises a primary body and a secondary body. A handle is coupled to the primary body. The primary body and the secondary body slidably engage for defining a telescoping engagement. The telescoping engagement provides a varying tool length. A slip nut engages the telescoping engagement for coupling the primary body to the secondary body and defining a fixed tool length. An appendage is coupled to the secondary body for increasing the contact surface area between the secondary body and the substance and improving the blending of the substance within the blender container. The varying tool length is configured for maintaining a separation between the secondary body and the mixing blade.

24 Claims, 11 Drawing Sheets

BLENDER TOOL

CROSS-REFERENCE TO RELATED APPLICATIONS

This application claims benefit of U.S. Pat. Provisional Application Serial No. 62/960,264 filed Jan. 13, 2020. All subject matter set forth in Provisional Application Serial No. 62/960,264 is hereby incorporated by reference into the present application as if fully set forth herein.

BACKGROUND OF THE INVENTION

Field of the Invention

This invention relates to mixing and more particularly to an improved blender tool.

Background of the Invention

In order to encourage increased preparation of healthy substances and other nutritious drinks and blended foods individuals have utilized a blender. Hundreds of millions of standard food blenders are used throughout the world. The blenders are designed with either a glass or plastic jar and have a rotating blade structure at the bottom. The rotating blade structure frequently creates air pockets and or a vortex resulting in food remaining above the level of the blade structure. This requires insertion of blender tool such as wooden spoons by either removing the lid, or using the circular opening created by removal of the plastic measuring cup that is typically part of the lid. The blender tool is intended to push the food down through the air pocket or vortex, often causing the blender tool to make contact with the blade structure. This is dangerous, harmful to the kitchen object, and contaminates the food preparation.

There have been many in the prior art who have attempted to solve these problems with varying degrees of success. None, however completely satisfies the requirements for a complete solution to the aforestated problem. The following U.S. Patents are attempts of the prior art to solve this problem.

U.S. Pat. 10,201,790 to Hoare, et al. discloses a motorized kitchen apparatus including a processor module coupled to a non-volatile storage medium for storing a custom sequence; a user interface having a speed or power selection element and a record selector; a motor controller coupled to a blender motor, the processor module coupled to the motor controller for controlling operation of the motor according to user input selections. Upon user selection of the record selector, the processor module enters a record mode and records a sequence of user inputs made through the user interface; the sequence including data indicative of a power profile selected by the user over a period of time, and upon completion of the record mode, the processor module saves a custom sequence indicative of the recorded sequence to the non-volatile storage medium for subsequent playback.

U.S. Pat. D666,056 to Boozer, et al. discloses an ornamental design of a blender tamper, as shown and described.

U.S. Pat. Application 2019/0117005 to Kettavong, et al. discloses a blender system including a base and a steamer basket. The basket is inserted into a container. The container has interior pillars. The basket contacts and rests on the pillars. The pillars keep the basket above blades disposed in the container. The basket receives foodstuff. The base includes a motor and a housing. The container is attached to the housing. The motor drives the blades to interact with contents within the container.

U.S. Pat. Application 2019/0142221 to Miller et al. discloses a blending system including a container and a tamper. The container includes a lid. The tamper may be inserted into the container through an aperture of the lid. The tamper extends towards but does not touch a blade assembly. The tamper is positionable in a vertical position and an angled position. The tamper includes a stop that prevents the tamper from touching the blade assembly in the first position. Another stop prevents the tamper from touching the blade in a second position. The tamper may reach toward the edges of the container in an angled position to manipulate foodstuffs.

Although the aforementioned prior art have contributed to the development of the art of blending tools none of these prior art patens have solved the needs of the art.

Therefore, it is an object of the present invention to provide an improved blender tool that assists in blending a substance within the blender.

Another object of this invention is to provide an improved blender tool that may be utilized on numerous blenders.

Another object of this invention is to provide an improved blender tool that is easily cleaned.

Another object of this invention is to provide an improved blender tool that is easy for an operator to use.

Another object of this invention is to provide an improved blender tool that is cost effective to produce.

The foregoing has outlined some of the more pertinent objects of the present invention. These objects should be construed as being merely illustrative of some of the more prominent features and applications of the invention. Many other beneficial results can be obtained by modifying the invention within the scope of the invention. Accordingly other objects in a full understanding of the invention may be had by referring to the summary of the invention, the detailed description describing the preferred embodiment in addition to the scope of the invention defined by the claims taken in conjunction with the accompanying drawings.

SUMMARY OF THE INVENTION

The present invention is defined by the appended claims with specific embodiments being shown in the attached drawings. For the purpose of summarizing the invention, the invention relates to an improved blender tool for assisting in blending a substance within a blender. The blender has a blender container for receiving the substance. A mixing blade is positioned within the blending container for blending the substance. A lid engages with the blending container. A lid aperture is in the lid. The lid aperture has a lid aperture diameter. The blending tool includes a primary body extending between a proximal end and a distal end. A handle is coupled to the proximal end of the primary body. A secondary body extends between a proximal end and a distal end. The distal end of the primary body and the proximal end of the secondary body slidably engage for defining a telescoping engagement. The telescoping engagement provides a varying tool length. A slip nut engages the telescoping engagement for coupling the primary body to the secondary body and defines a fixed tool length. An appendage is coupled to the secondary body for increasing the contact surface area between the secondary body and the substance and improves the blending of the substance within the blender container. The varying tool length is configured for maintaining a separation between the distal end of the secondary body and the mixing blade.

In a more specific embodiment of the invention, a slip washer engages with the telescoping engagement. The slip nut compresses the slip washer into the telescoping engagement for preventing the substance from entering the primary body and the secondary body.

In another embodiment of the invention, a first descending stop tab and a second descending stop tap are coupled to the slip nut. The first descending stop tab and the second descending stop tap assist in applying a rotational force to the slip nut. The first descending stop tab and the second descending stop tap contact the blender container or lid for terminating further descending displacement of the blender tool and preventing contact between the distal end of the secondary body and the mixing blade.

In another embodiment of the invention, the appendage includes a plurality of elongated fins.

In another embodiment of the invention, the secondary body defines a secondary body diameter. An upper secondary conical body is in the secondary body. The upper secondary conical body defines a descending decreasing cross-sectional area. An extension body is coupled to the upper secondary conical body. The extension body defines an extension body diameter. A lower secondary conical body is coupled to the extension body. The lower secondary conical body defines a descending increasing cross-sectional area. The extension body diameter is less than the secondary body diameter for defining a circular channel between the upper secondary conical body and the lower secondary conical body The appendage is coupled to the extension body and extends into the circular channel.

In another embodiment of the invention, a contact body is coupled to the lower secondary conical body. The contact body defines a contact body diameter. The contact body diameter is greater than the extension body diameter for defining a contact knob for displacing the substance within the blender.

The foregoing has outlined rather broadly the more pertinent and important features of the present invention in order that the detailed description that follows may be better understood so that the present contribution to the art can be more fully appreciated. Additional features of the invention will be described hereinafter which form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be made to the following detailed description taken in connection with the accompanying drawings in which.

Similar reference characters refer to similar parts throughout the several Figures of the drawings.

DETAILED DISCUSSION

FIGS. 1-23 illustrate a blender tool 10 for assisting in blending a substance 20 within a blender 30. The substance 20 may include an edible solid, edible liquid, non-edible solid, non-edible liquid or other items that need mixing. The blender 30 has a blender container 32 for receiving the substance 20. The blender container 32 engages a blender base 34 that contains a motor 36. A mixing blade 40 is positioned within the blending container 32 for blending the substance 20. The blending blade 40 may be removably coupled to the motor 36 for providing a rotational displacement. The blending container 32 may have various blender heights that results in various dimensions between the mixing blade 40 and the top of the blender container 32. For example, FIGS. 14, 15 and 21-23 illustrate the blender container 32 having a first blender height 50. FIGS. 16, 17 and 20 illustrate the blender container 32 having a second blender height 52.

A lid 42 may engage with the blending container 32 for maintaining the substance 20 within the blender container 32 during blending of the substance 20. The lid 42 may include a lid aperture 44. The lid aperture 44 has a lid aperture diameter 46. A cap 48 may be utilized for positioning within the lid aperture 44.

Typically during operation of the blender 30, the rotation of the mixing blade 40 in the substance 20 creates air pockets 54 and vortex 56. The resulting air pockets 54 and the vortex 56 may inhibit the thorough mixing of the substance 20 and may increase the time needed to thoroughly mix the substance 20. More specifically, the resulting air pockets 54 and vortex 56 may result in the substance 20 remaining above the level of the mixing blade 40.

The blender tool 10 may be utilized for positioning within the blender container 32 for reducing or eliminating air pockets 54 and the vortex 56 thereby improving the mixing of the substance 20 and also reducing the time needed to mix the substance 20. The blender tool 10 may further reduce any cavitation around the blending plate 40 within the substance 20 thereby improving the mixing of the substance 20 and also reducing the time needed to mix the substance 20.

The blender tool 10 includes a primary body 60 extending between a proximal end 62 and a distal end 64. A secondary body 80 extends between a proximal end 82 and a distal end 84. The distal end 64 of the primary body 60 and the proximal end 82 of the secondary body 80 slidably engage for defining a telescoping engagement. 100. The primary body 60 includes a primary body diameter 66 and the secondary body 80 includes a secondary body diameter 86. The primary body diameter 66 may be greater than the secondary body diameter 86 in order for the secondary body 82 to slidably engage within the primary body 60. The telescoping engagement 100 provides a varying tool length 102. The varying tool length 102 is configured for adjusting the overall length of the blender tool 10 for maintaining a separation between the distal end 84 of the secondary body 80 and the mixing blade 40.

A slip nut 110 engages the telescoping engagement 100 for coupling the primary body 60 to the secondary body 80 and creating a fixed tool length 104. Preferably, the fixed tool length 104 is set such that the distal end 84 of the secondary body 80 avoids contact with the mixing blade 40. Maintaining a proper separation between the distal end 84 of the secondary body 80 and the mixing blade 40 may be very crucial in order to avoid damage of the blender 30 and the blending tool 10. Furthermore, if a proper separation between the distal end 84 of the secondary body 80 and the mixing blade 40 is not maintained, an individual may inadvertently consume a portion of the mixing blade 40 and or a portion of the blender tool 10 had has become fractured leading to injury.

The fixed tool length 104 further permits the blender tool 10 to displace the substance 20 in a descending or lateral displacement in an effort to bring the substance 20 into contact with the mixing blade 40. By displacing the substance 20 into contact with the mixing blade 40 improves the mixing of the substance 20 and also reducing the time needed to mix the substance 20.

Figure 1:
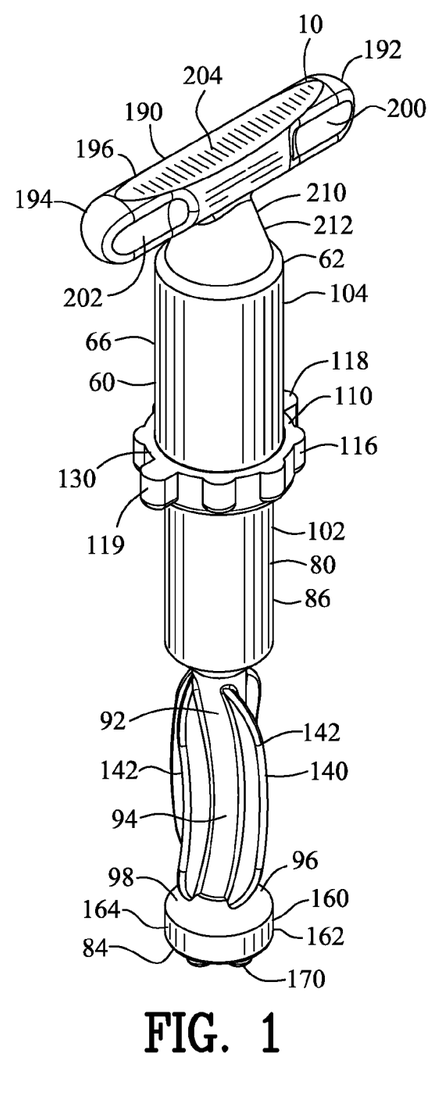
FIG. 1 is an upper isometric view of a blender tool incorporating the present invention.
Figure 2:
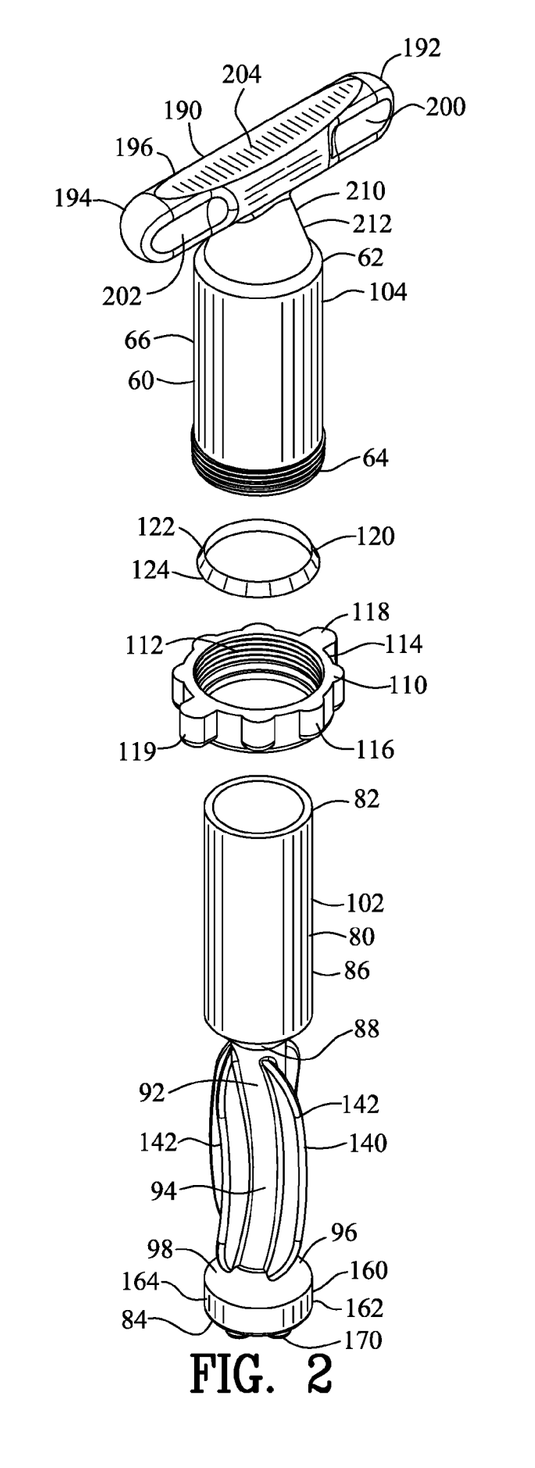
FIG. 2 is an exploded view of FIG. 1.
Figure 3:
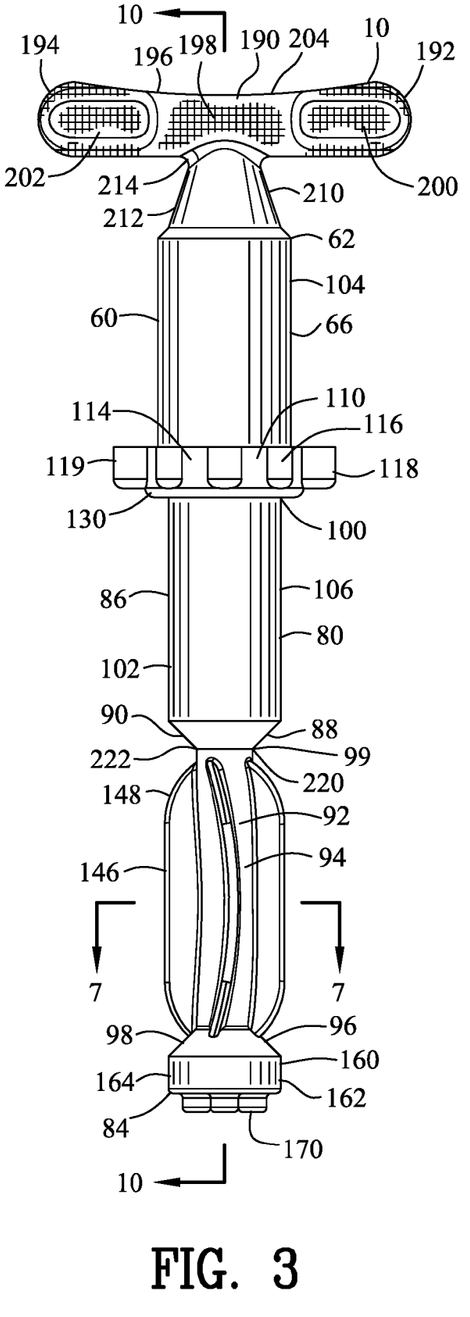
FIG. 3 is a front view of FIG. 1.
Figure 4:
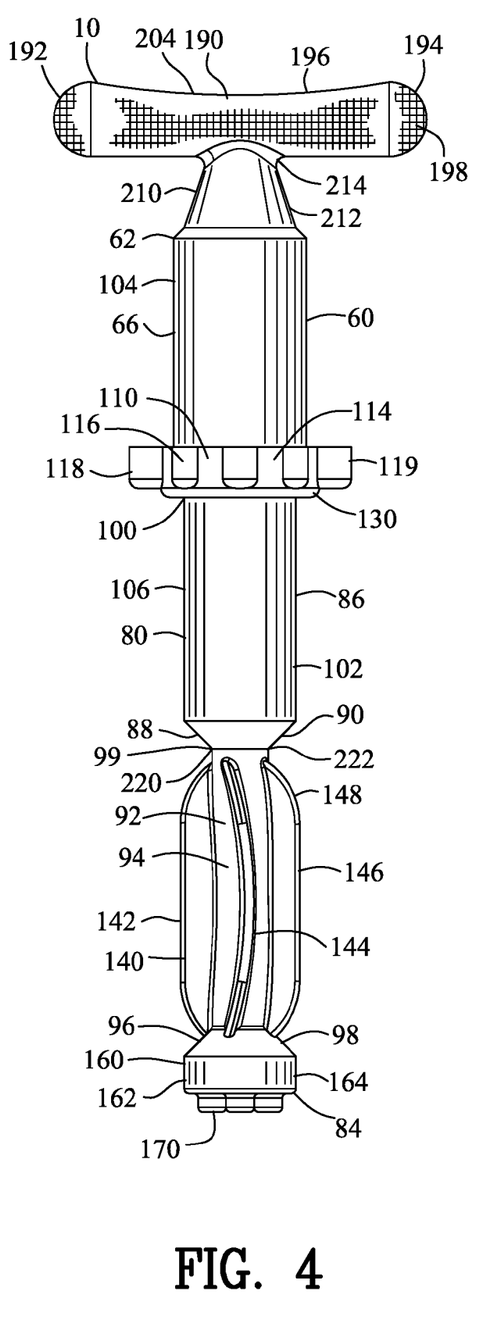
FIG. 4 is a rear view of FIG. 1.
Figure 5:
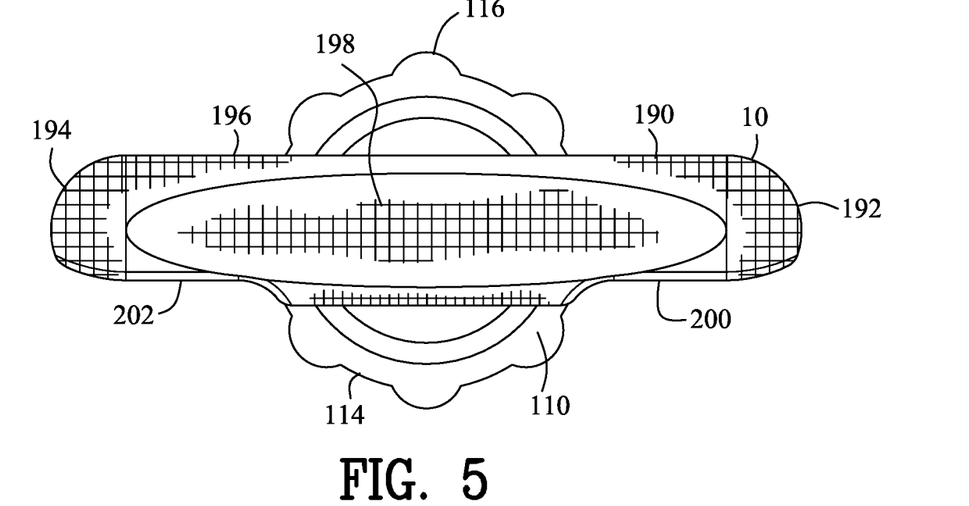
FIG. 5 is a top view of FIG. 1.
Figure 6:
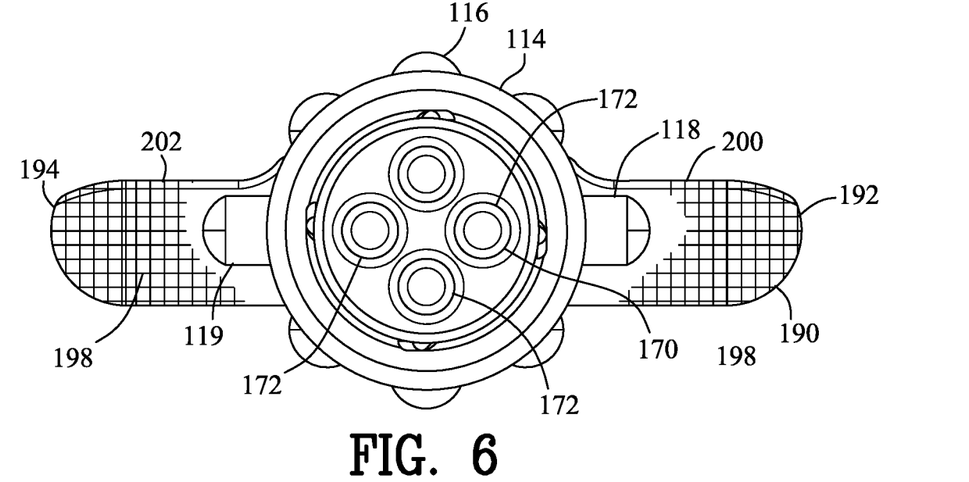
FIG. 6 is a bottom view of FIG. 1.
Figure 7:
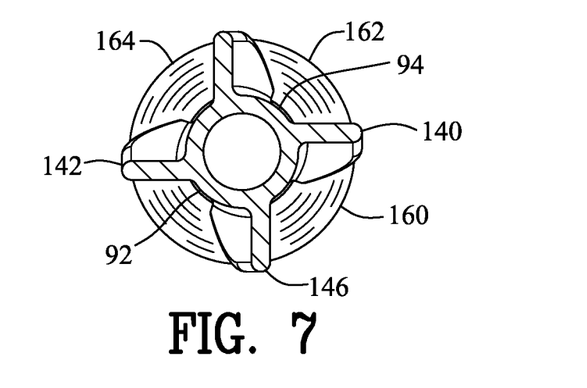
FIG. 7 is a sectional view along line 7-7 in FIG. 3.
Figure 8:
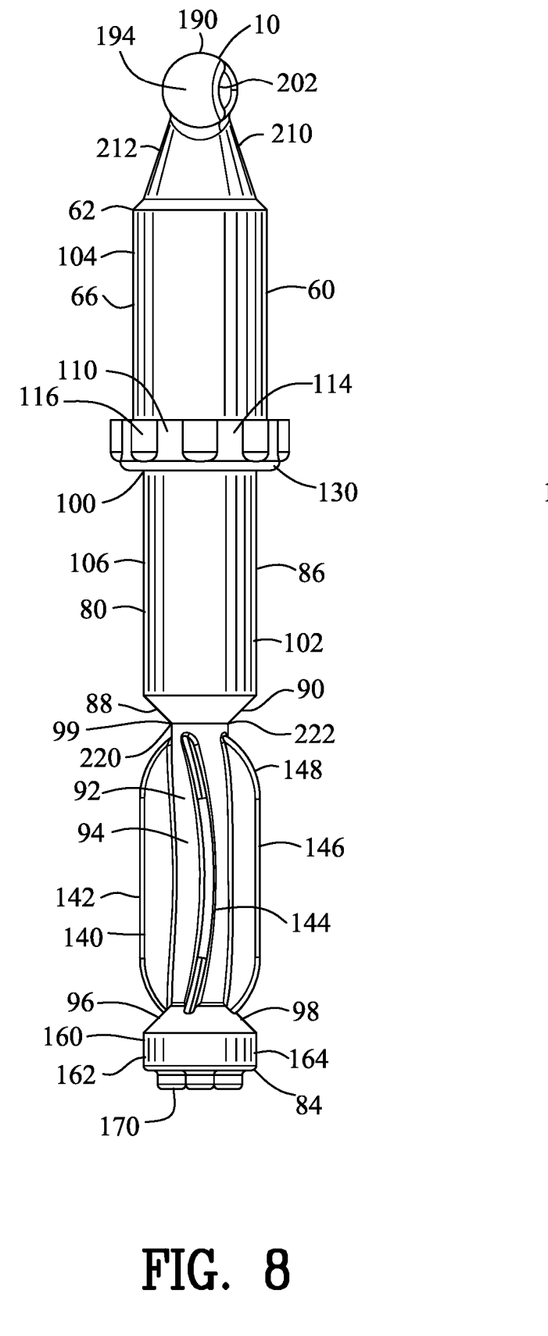
FIG. 8 is a left side view of FIG. 1.
Figure 9:
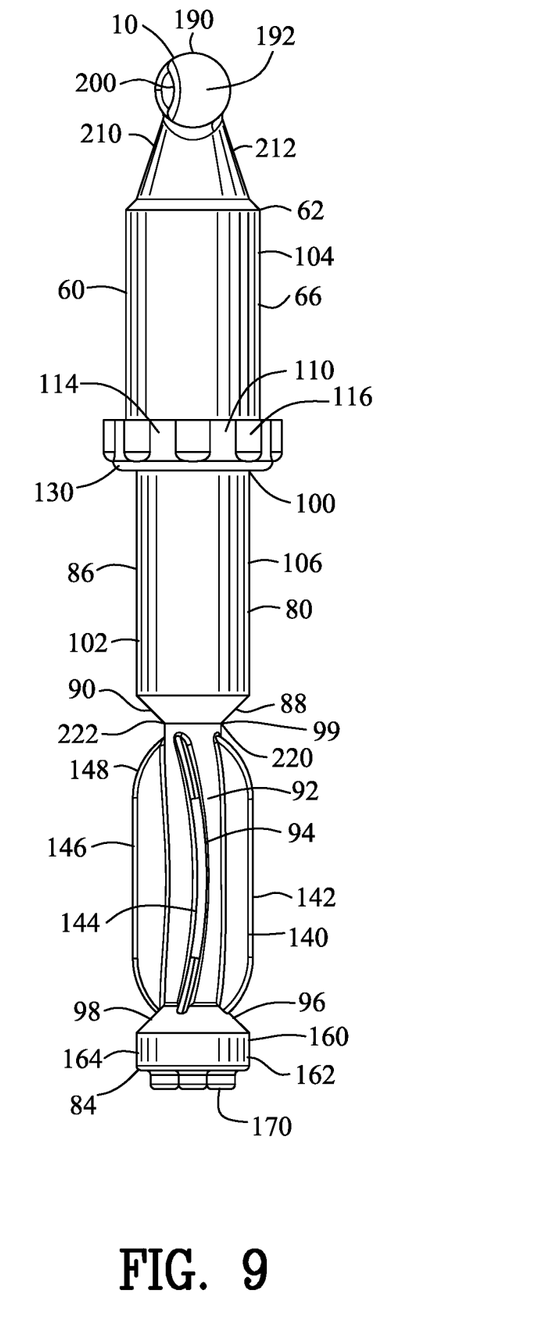
FIG. 9 is a right side view of FIG. 1.
Figure 10:
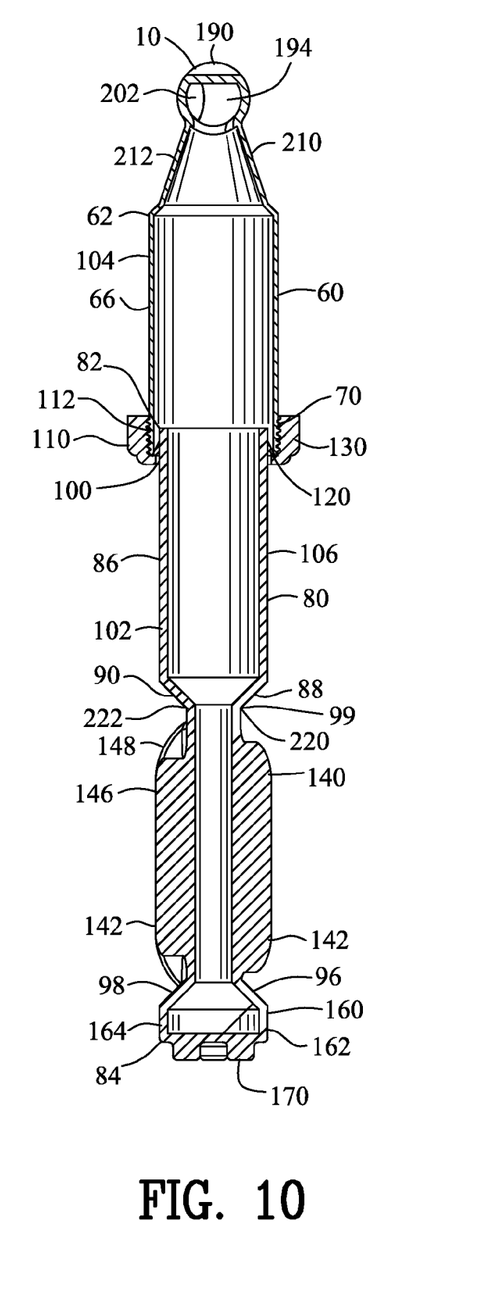
FIG. 10 is a sectional view along line 10-10 in FIG. 3.
Figure 11:
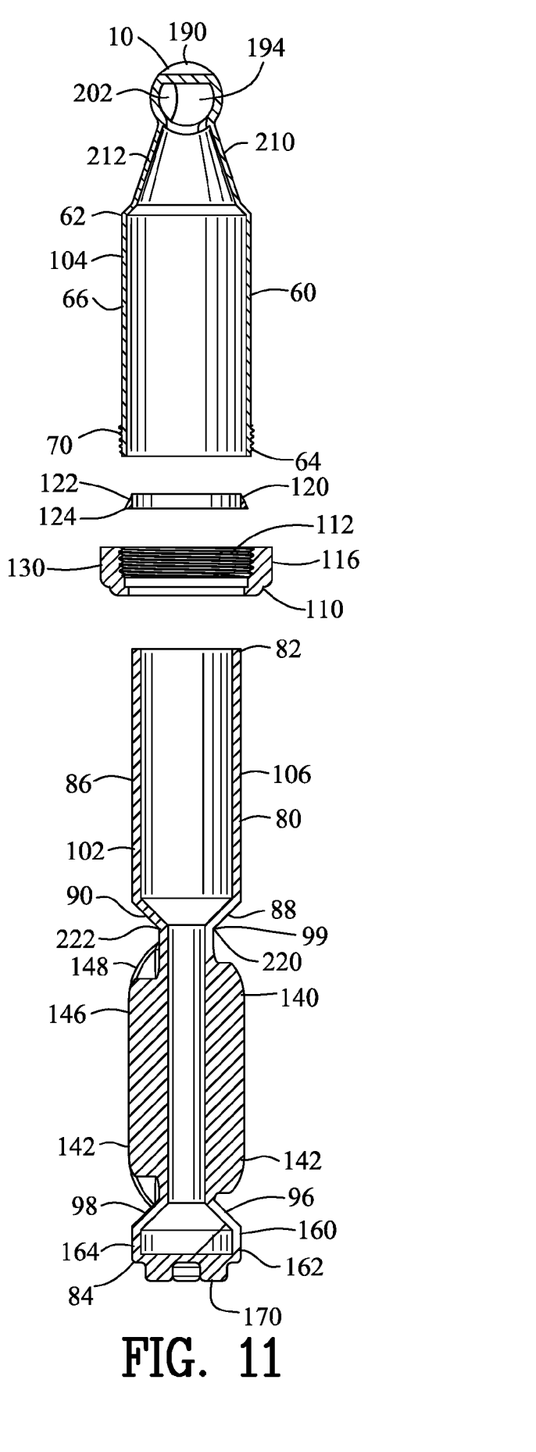
FIG. 11 is an exploded view of FIG. 10.
Figure 12:
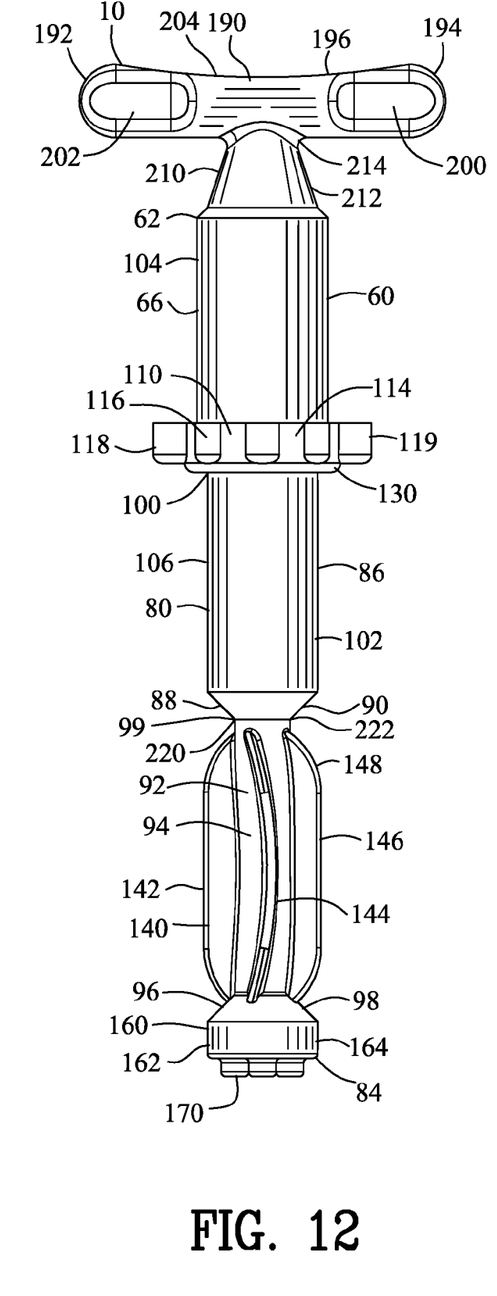
FIG. 12 is a view similar to FIG. 3 illustrating a maximum telescoping length.
Figure 13:
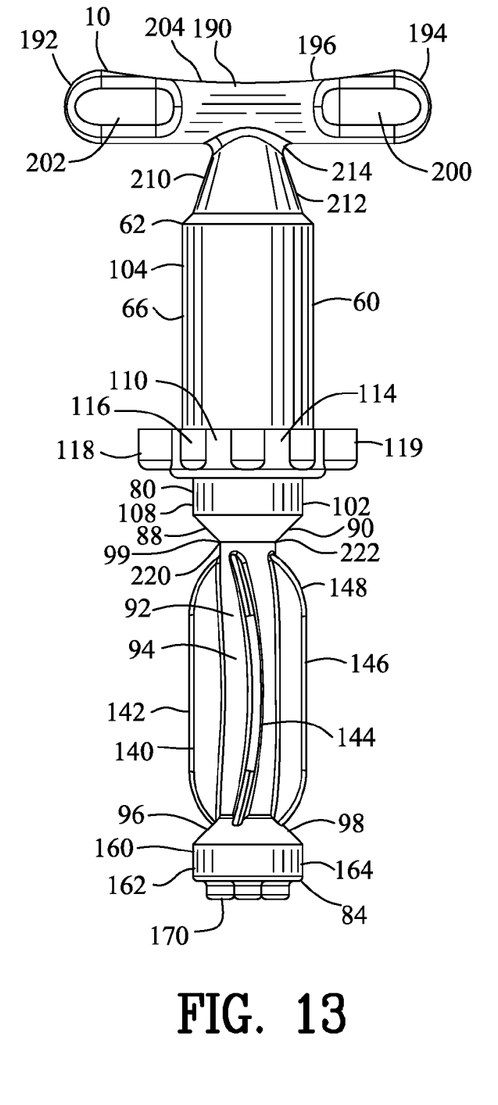
FIG. 13 is a view similar to FIG. 12 illustrating a minimum telescoping length.

FIGS. 1-4, 8-10, 12, 14-18 and 21-23 illustrate the blending tool 10 having a maximum telescoping length 106. FIGS. 13, 19 and 20 illustrate the blending tool 10 having a minimum telescoping length 108. The telescoping engagement 100 enables the overall length of the blender tool 10 to be adjusted in order to maintain a separation between the distal end 84 of the secondary body 80 and the mixing blade 40. The telescoping engagement. 100 further permits the blender tool 10 to be utilized with multiple blenders 30 with different heights of the blender container 32. For example, the blender 30 as shown in FIGS. 14-14, 15 and 21-23 has a blender container 32 which is greater in height than the blender container 32 as shown in FIGS. 16, 17 and 20.

The distal end 64 of the primary body 60 may include an exterior threaded surface 70. The slip nut 110 has an interior threaded surface 112. The slip nut 110 threadably engages the exterior threaded surface 74 compressing the primary body 60 and the secondary body 80 together. A slip washer 120 may be used in conjunction with the telescoping engagement 100. The slip washer 120 includes a tapered surface 122 and a backing surface 124. The slip washer 120 encircles the secondary body 80 and is compressed against the distal end 64 of the primary body 60. The slip nut 110 threadably engages with the external threaded surface 70 and engages with the backing surface 124 of the slip washer 120. As the slip nut 110 is further threadably engaged with the primary body 60, the slip washer 120 is compressed between the primary body 60 and the secondary body 84 for defining the fixed tool length 104. The telescoping engagement 100, the slip nut 110 and the slip washer 120 may be defined by a plumbing slip joint 130 being constructed by a metallic or plastic material. The slip nut 110 also functions by compressing the slip washer 120 into the telescoping engagement 100 for preventing the substance 20 from entering the primary body 60 and the secondary body 80. The slip nut 110 may include one or more grasping knobs 116 for assisting in grasping the slip nut 110 and applying a rotational force.

An appendage 140 is coupled to the secondary body 80 for increasing the contact surface area between the secondary body 80 and the substance 20 and improves the blending of the substance 20 within the blender container 32. The appendage 140 improves the blending of the substance 20 within the blender container 32 by creating a non-laminar flow of the substance 20 within the blender container 32. The appendage 140 may include a plurality of elongated fins 142. The plurality of elongated fins 142 may be constructed of a rigid material or a flexible material. Preferably, the plurality of elongated fins 142 and the secondary body 80 are constructed of an integral one-piece unit. The plurality of elongated fins 142 may be positioned equidistant around the circumference of the secondary body 80. The plurality of fins 142 may have a concave shape 144 for creating a non-laminar flow of the substance 20 and improving the blending of the substance 20 within the blender container 32. Alternatively, the plurality of fins 142 may have wave shape fins, zig zag shape fins or other configurations.

The secondary body 80 may include an upper secondary conical body 88. The upper secondary conical body 88 defines a descending decreasing cross-sectional area 90. An extension body 92 is coupled to the upper secondary conical body 88. The extension body 92 defines an extension body diameter 94. A lower secondary conical body 96 is coupled to the extension body 92. The lower secondary conical body 96 defines a descending increasing cross-sectional area 98. The extension body diameter 94 is less than the secondary body diameter 86 for defining a circular recessed channel 99 between the upper secondary conical body 88 and the lower secondary conical body 96. The appendage 140 may be coupled to the extension body 92 and extends into the circular recessed channel 99.

The extension body 92 and the appendage 140 define an appendage diameter 146. Preferably, the appendage diameter 146 is less than the lid aperture diameter 46 for permitting the secondary body 80 and the appendage 140 to be inserted through the lid aperture 44 and into the blender container 32.

Figure 23:
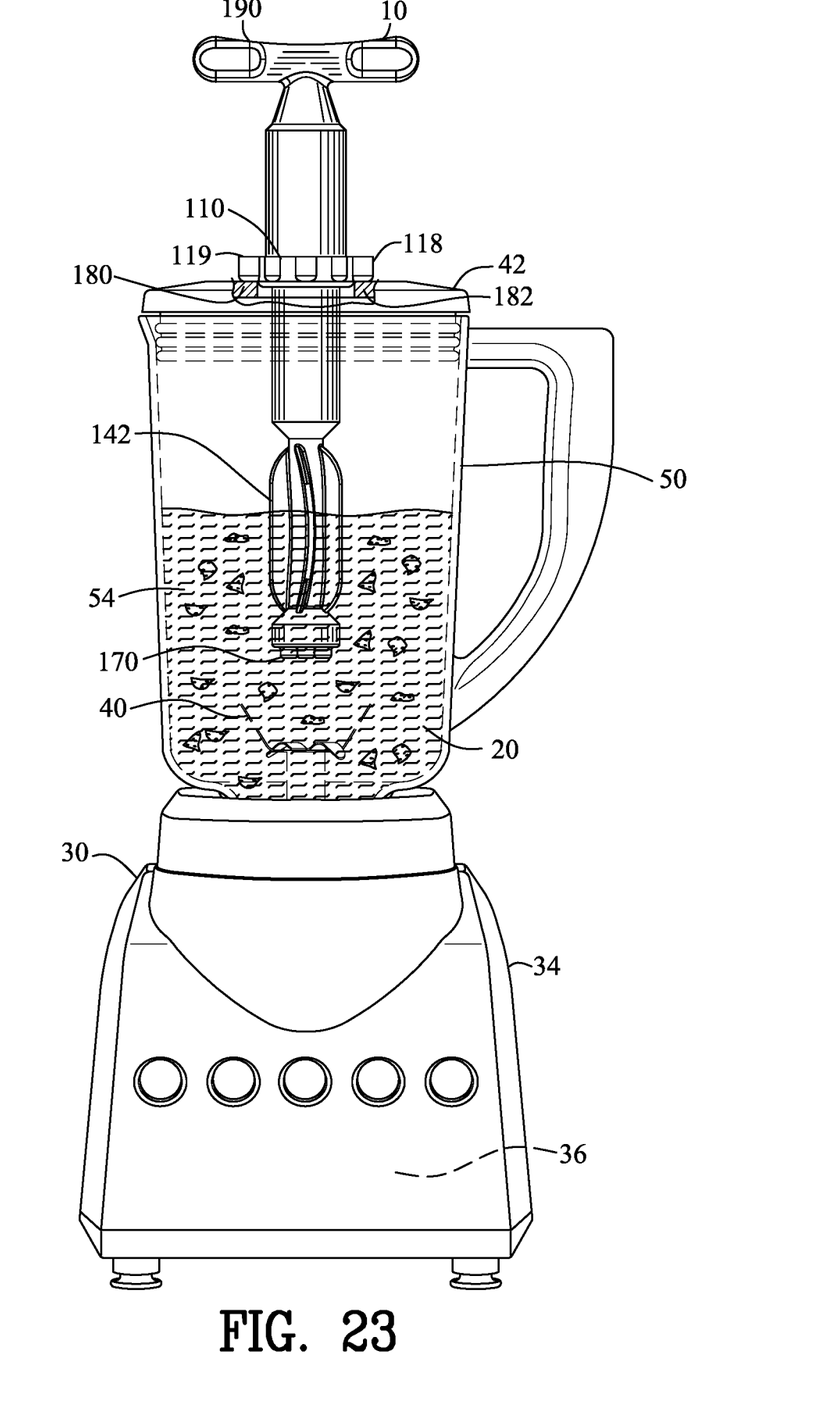
FIG. 23 is a view similar to FIG. 22 illustrating the blender tool assisting in blending the substance within the blender.

A contact body 160 may be coupled to the lower secondary conical body 96. The contact body defines a contact body diameter 162. The contact body diameter 162 is greater than the extension body diameter 94 for defining a contact knob 164 for displacing the substance 20 within the blender container 32. More specifically, as best shown in FIG. 23, the contact knob 164 may be utilized for pushing down or sideways the substance 20 into close proximity to the mixing blade 40. Preferably, the contact body diameter 162 is less than the lid aperture diameter 46 for permitting the secondary body 80 and the contact knob 164 to be inserted through the lid aperture 44 and into the blender container 32.

A plurality of grasping tabs 170 may be coupled to the distal end 84 of the secondary body 80. More specifically, the plurality of grasping tabs 170 may be coupled to the contact knob 164. The plurality of grasping tabs 170 entangles with or impale into the substance 20 within the blender tool 10 for positioning the substance 20 in close proximity to the mixing blade 40. The plurality of grasping tabs 170 may define a grid orientation 172 for entangling with or impaling into the substance 20. The grid orientation 172 may include a plurality of rows and a plurality of columns, circular orientation, X-shape orientation or other positioning orientations. The plurality of grasping tabs 170 further increase the contact surface area between the secondary body 80 and the substance 20 and improve the blending of the substance 20 within the blender container 32. The plurality of grasping tabs 170 improves the blending of the substance 20 within the blender container 32 by creating a non-laminar flow of the substance 20 within the blender container 32.

The blender tool 10 may be utilized without the lid 42 engaging the blender container 32. In this way, the blender tool 10 is utilized by insertion into the blender container 32. The slip nut 110 can be used as an elevational gauge 180 to avoid contact between the distal end 84 of the secondary body 80 with the mixing blade 40. In addition, the slip nut 110 can be used as a rim stop 182 by contacting the upper surface of the blender container 32 in order to avoid contact between the distal end 84 of the secondary body 80 with the mixing blade 40.

The blender tool 10 may also be utilized with the lid 42 engaging the blender container 32. In this way, the blender tool 10 traverses the lid aperture 44. In order to facilitate the insertion of the blender tool 10 through the lid aperture 44 and into the blender container 32, the secondary body diameter 86 is less than the lid aperture diameter 46. This permits the secondary body 80 and the appendage 140 to be inserted through the lid aperture 44 and into the blender container 32.

As best shown in FIGS. 15, 17, 20 and 23, the slip nut 110 defines a slip nut diameter 114. The slip nut diameter 114 may be greater than the lid aperture diameter 46 for contacting the lid 42 and terminating further descending displacement of the blender tool 10 and preventing contact between the distal end 84 of the secondary body 80 and the mixing blade 40.

The grasping knobs 116 of the slip nut 110 may define a first descending stop tab 118 and a second descending stop tap 119. The first descending stop tab 118 and the second descending stop tap 119 assist in applying a rotational force to the slip nut 110. The first descending stop tab 118 and the second descending stop tap 119 may further assure contact with the edge of the blender container 32 if the lid 42 is not utilized. Furthermore, first descending stop tab 118 and the second descending stop tap 119 may further assure contact with the lid 42 for terminating further descending displacement of the blender tool 10 and preventing contact between the distal end 84 of the secondary body 80 and the mixing blade 40. The slip nut 110 may also function as a cap 48 wherein the slip nut 110 is positioned immediately adjacent to the lid 42. More specifically, the slip nut 110 may prevent the substance 20 from being ejected out of the blender container 32 during blending of the substance 20 by the slip nut 110 repelling the substance 20 back into the blender container 32.

A handle 190 may be coupled to the proximal end 52 of the primary body 60. The handle 190 may include a first handle portion 192 and a second handle portion 194. The handle 190 and the primary body 60 may define a general T-shaped handle 196. The first handle portion 192 may include a first elongated groove 200. Similarly, the second handle portion 194 may include a second elongated groove 202. The first elongated groove 200 may receive a thumb of the individual and the second elongated groove 202 may receive a portion of the hand of the individual for facilitating grasping of the handle 190. The handle 190 may include a concave upper surface 204 facilitating grasping of the handle 190. The handle 190 may include a griping surface 198 for facilitating grasping of the handle 190. The griping surface 198 may include a latex coating, a knurling surface, a ribbed surface, or other raised surface to improve gripping.

The blender tool 10 may further include a primary conical body 210 coupling the primary body 60 with the handle 190. The primary conical body 210 defines an ascending decreasing cross-sectional area 212. The handle 190 and the primary conical body 210 define a circular gripping channel 214 for increasing the gripping the area of the blender tool 10.

As best shown in FIGS. 1-13 and 22, the blender tool 10 may further include a recess groove 220 in the secondary body 80 for aligning with the lid aperture 44. The recess groove 220 may be defined by the descending decreasing cross-sectional area 90 and a taper edge 148 in the appendage 140. The recess groove 220 may include a general V-shape groove 222. The recess groove 220 is configured for permitting laterally displacement of the primary body 60 or handle 190 relative to the lid 42 and producing a lateral displacement of the distal end 84 of the secondary body 80 within the blender container 32 for assisting in blending the substance 20 within the blender container 32. More specifically, the recess groove 220 permits side to side displacement of the distal end 84 for further mixing of the substance 20 and for reducing or eliminating air pockets 54 and the vortex 56 thereby improving the mixing of the substance 20 and also reducing the time needed to mix the substance 20. The recess groove 220 further permits positioning the plurality of grasping tabs 170 laterally relative to the blender container 32 and entangles with or impale into the substance 20 within the blender tool 10 for positioning the substance 20 in close proximity to the mixing blade 40.

Figure 14:
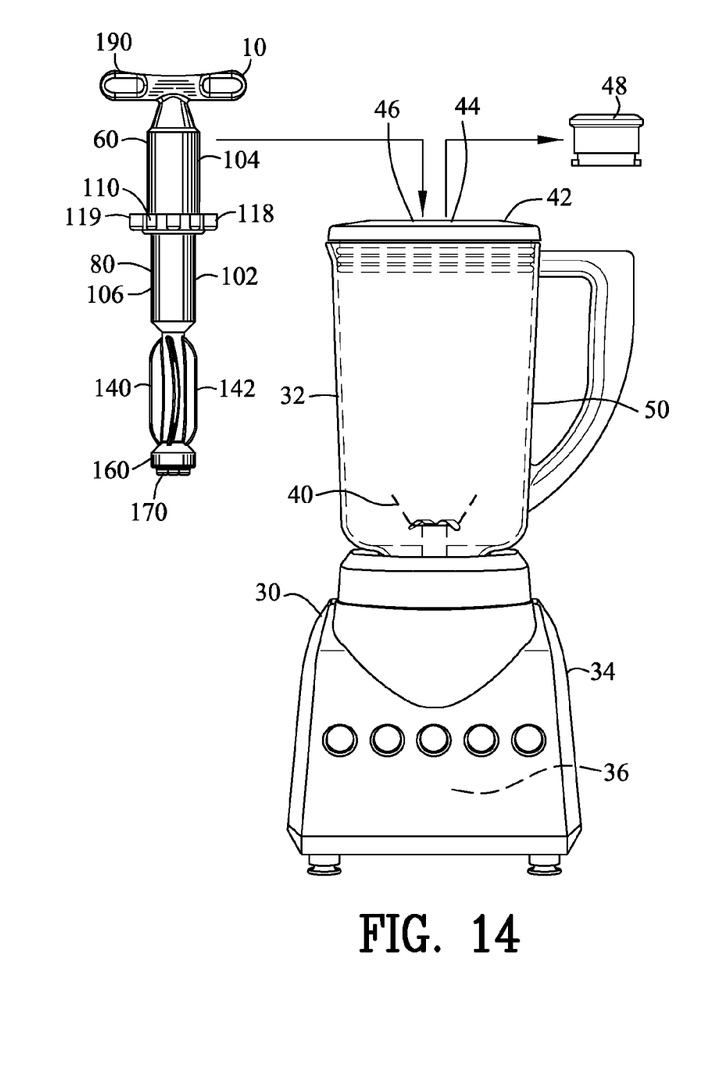
FIG. 14 is a view similar to FIG. 12 illustrating the blender tool positioned adjacent to a first blender.
Figure 15:
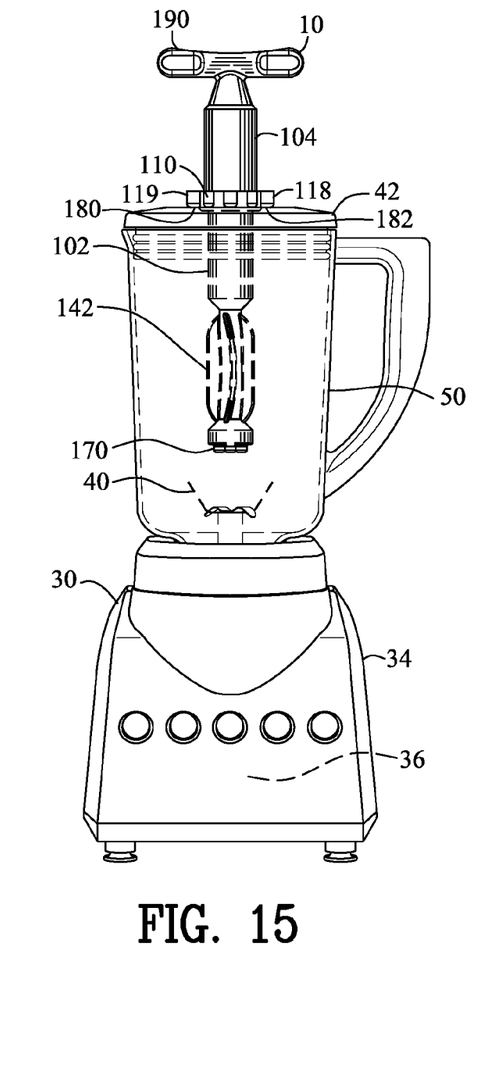
FIG. 15 is a view similar to FIG. 14 illustrating the blender tool with the maximum telescoping length inserted into the first blender and blender tool maintaining a separation between the blender tool and a mixing blade of the first blender.
Figure 16:
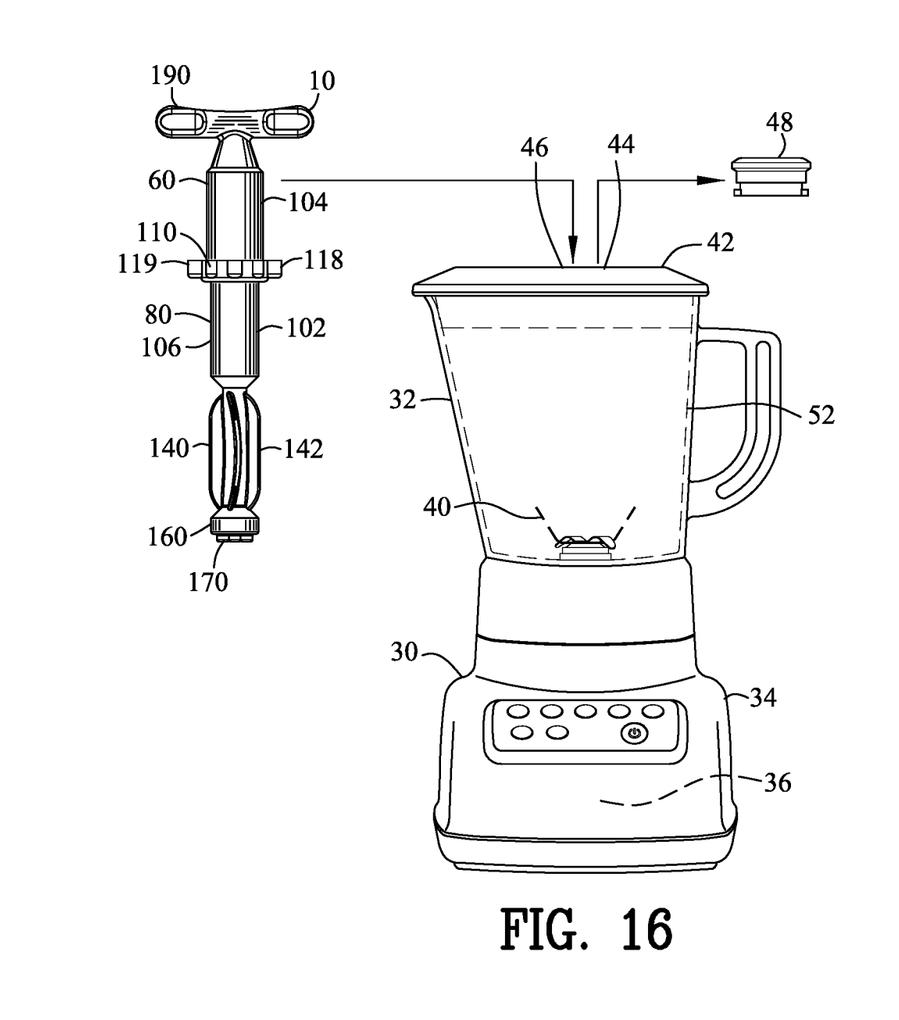
FIG. 16 is a view similar to FIG. 12 illustrating the blender tool positioned adjacent to a second blender.
Figure 17:
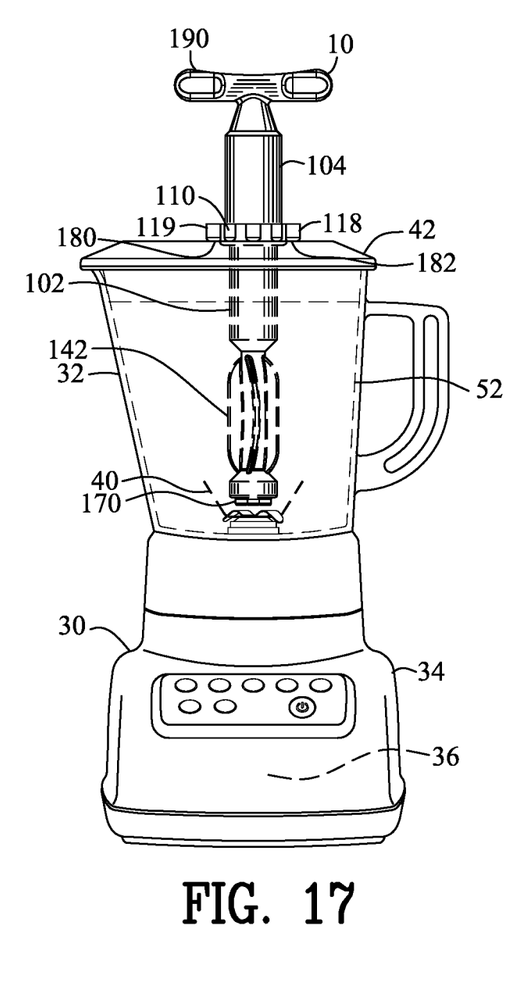
FIG. 17 is a view similar to FIG. 16 illustrating the blender tool with the maximum telescoping length inserted into the second blender and blender tool not maintaining a separation between the blender tool and a mixing blade of the second blender.

The method of utilizing the blender tool 10 is illustrated in FIGS. 14-23. In FIG. 14, the blender tool 10 positioned adjacent to a first blender height 50. The cap 48 is disengaged from the lid 42 for exposing the lid aperture 44. Thereafter, as shown in FIG. 15, the blending tool 10 is inserted into the lid aperture 44 for positioning the secondary body 80 within the blender container 32. The slip nut 110 terminates the further descending displacement of the blender tool 10 upon contact with the lid 42 for maintaining a proper distance between the distal end 84 of the secondary body 80 with the mixing blade 40. The fixed tool length 104 of the blender tool 10 has the maximum telescoping length 106 for substantially positioning the secondary body 80 within the blender container 32 while the slip nut 110 maintains a proper distance between the distal end 84 of the secondary body 80 with the mixing blade 40.

FIG. 16 illustrates the blender tool 10 having a fixed tool length 104 and having a maximum telescoping length 106 positioned adjacent to the second blender 52. The cap 48 is disengaged from the lid 42 for exposing the lid aperture 44. Thereafter as shown in FIG. 17, the blending tool 10 is inserted into the lid aperture 44 for positioning the secondary body 80 within the blender container 32. The slip nut 110 terminates a further descending displacement of the blender tool 10 upon contact with the lid 42, however the blending tool 10 does not maintain a proper distance between the distal end 84 of the secondary body 80 from the mixing blade 40. As such, the length of the blending tool must be transitioned from the maximum telescoping length 106 to the minimum telescoping length 108 to accommodate the second blender height 52.

Figure 18:
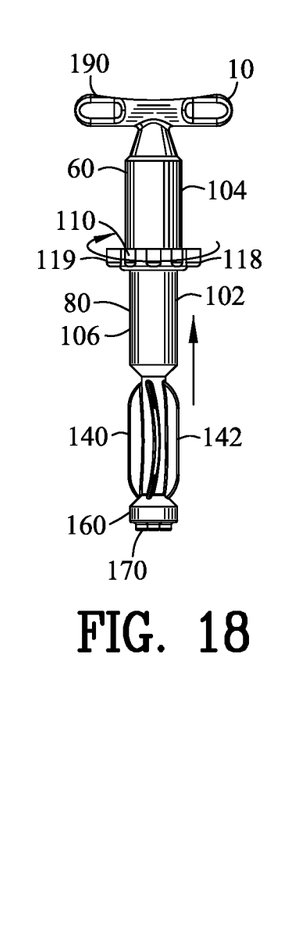
FIG. 18 is a view similar to FIG. 12 illustrating a telescoping engagement in the blender tool for varying the blender tool length from the maximum telescoping length.
Figures 19, 20:
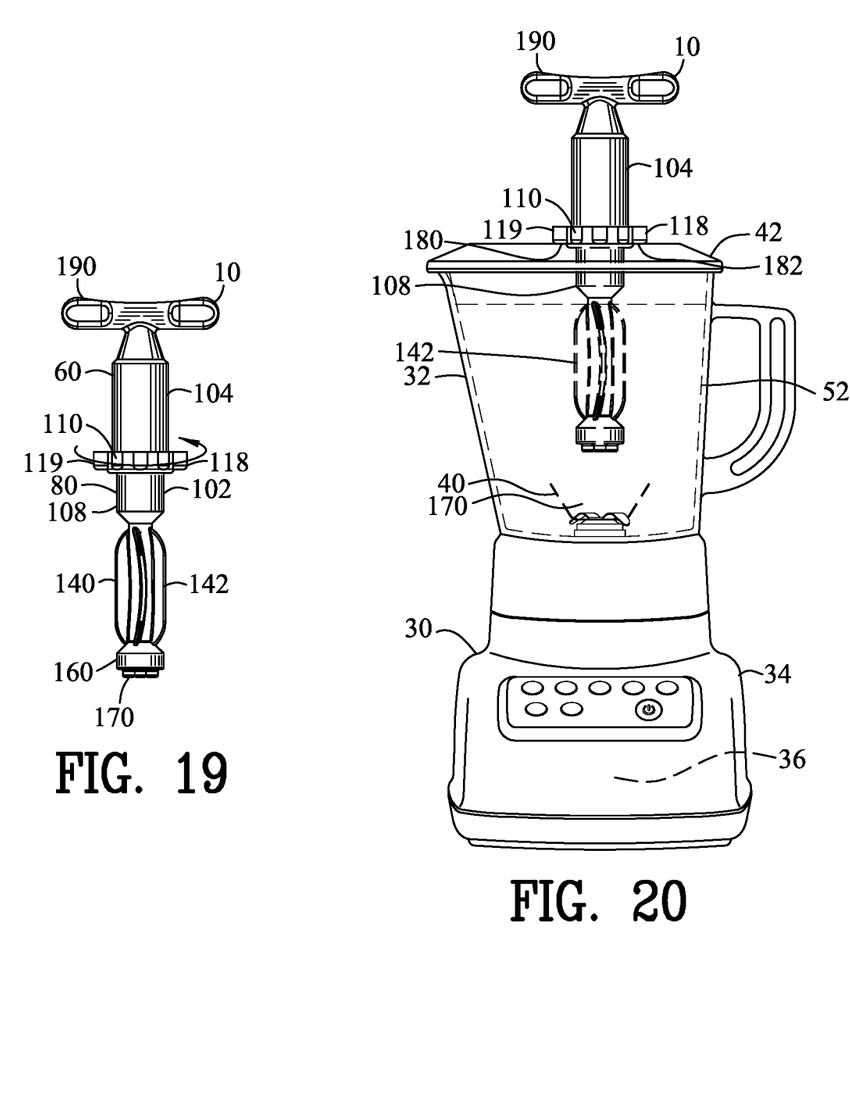
FIG. 19 is a view similar to FIG. 18 illustrating the telescoping engagement maintaining the minimum telescoping length.
FIG. 20 is a view similar to FIG. 17 illustrating the blender tool with the minimum telescoping length inserted into the second blender and blender tool maintaining a separation between the blender tool and the mixing blade of the second blender.

FIGS. 18 and 19 illustrate the process to transition the blender tool 10 from the maximum telescoping length 106 to the minimum telescoping length 108. More specifically, the slip nut 110 is rotatably displaced relative to the external threaded surface 74 for decompressing the slip washer 120 from between the primary body 60 and the secondary body 80. Thereafter, the primary body 60 and the secondary body 80 may slidably engage one another for varying the overall length of the blender tool 10. Once the proper overall length of the blending tool 10 has been selected, the slip nut 10 is rotatably displaced relative to the external threaded surface 74 for compressing the slip washer 120 between the primary body 60 and the secondary body 80. Thereafter the primary body 60 and the secondary body 80 are no longer slidably engageable.

As shown in FIG. 20, the blending tool 10 is then inserted into the lid aperture 44 for positioning the secondary body 80 within the blender container 32. The slip nut 110 terminates the further descending displacement of the blender tool 10 upon contact with the lid 42 for maintaining a proper distance between the distal end 84 of the secondary body 80 with the mixing blade 40. The fixed tool length 104 of the blender tool 10 has the minimum telescoping length 108 for substantially positioning the secondary body 80 within the blender container 32 while the slip nut 110 maintains a proper distance between the distal end 84 of the secondary body 80 with the mixing blade 40.

Figure 21:
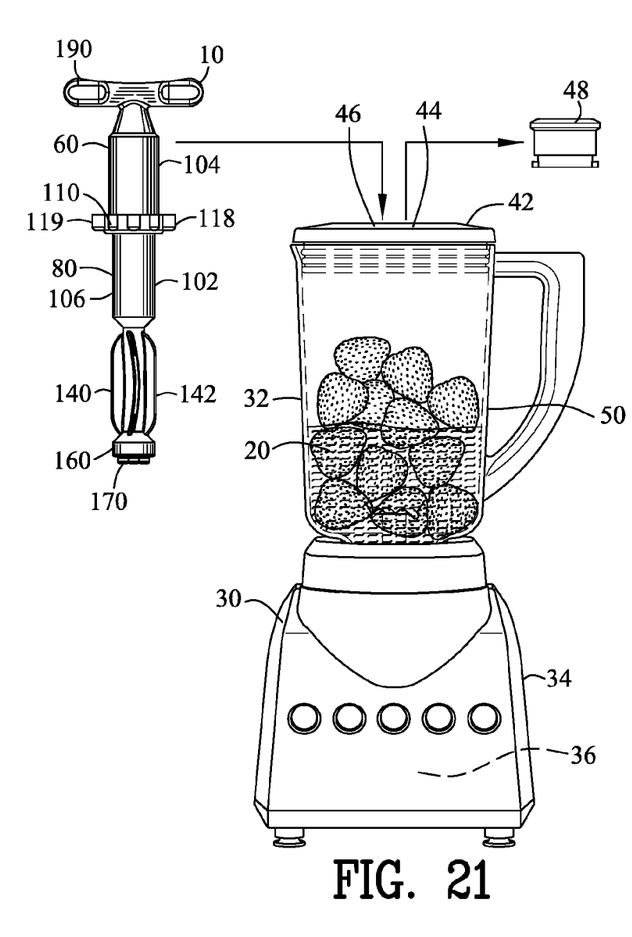
FIG. 21 is a view similar to FIG. 14 illustrating a substance within the first blender.
Figure 22:
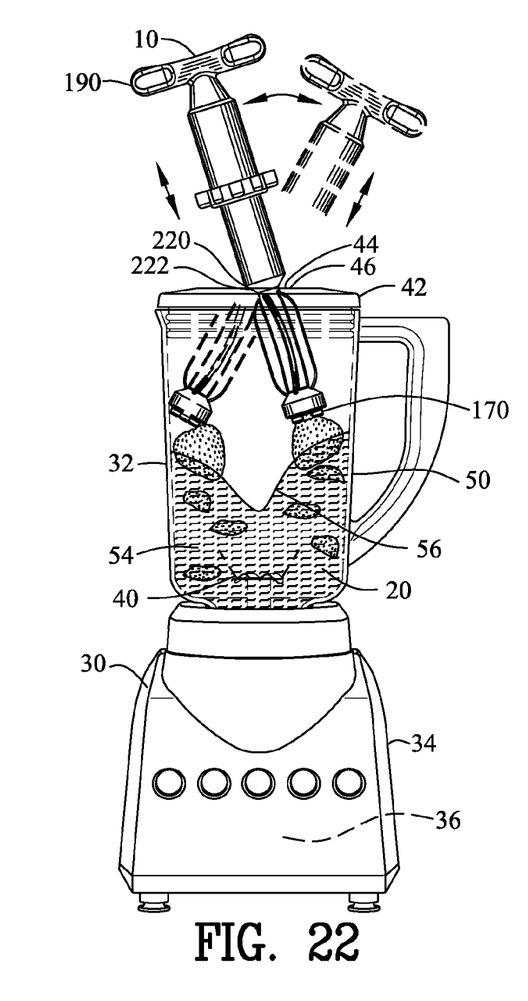
FIG. 22 is a view similar to FIG. 21 illustrating the blender tool assisting in blending the substance within the blender by pushing the substance into the mixing blades.

FIG. 21 illustrates the substance 20 positioned within the first blender height 50. The blender tool 10 is positioned adjacent to the first blender height 50. The cap 48 is disengaged from the lid 42 for exposing the lid aperture 44. Thereafter as shown in FIG. 22, the blending tool 10 is inserted into the lid aperture 44 for positioning the secondary body 80 within the blender container 32. The recess groove 220 is aligning with the lid aperture 44. The recess groove 220 allows the laterally displacement of the primary body 60 or handle 190 relative to the lid 42 and produces a lateral displacement of the distal end 84 of the secondary body 80 within the blender container 32 for assisting in blending the substance 20 within the blender container 32. More specifically, the recess groove 220 permits side to side displacement of the distal end 84 for mixing the substance 20 and reducing or eliminating air pockets 54 and the vortex 56 thereby improving the mixing of the substance 20 and also reducing the time needed to mix the substance 20. The recess groove 220 further permits positioning the plurality of grasping tabs 170 laterally relative to the blender container 32 and entangles with or impale into the substance 20 within the blender tool 10 for positioning the substance 20 in close proximity to the mixing blade 40.

FIG. 23 illustrates the blending tool 10 inserted into the lid aperture 44 for positioning the secondary body 80 within the blender container 32. The slip nut 110 terminates a further descending displacement of the blender tool 10 upon contact with the lid 42 for maintaining a proper distance between the distal end 84 of the secondary body 80 with the mixing blade 40. The fixed tool length 104 of the blender tool 10 has the maximum telescoping length 106 for substantially positioning the secondary body 80 within the blender container 32 while the slip nut 110 maintains a proper distance between the distal end 84 of the secondary body 80 with the mixing blade 40.

FIG. 23 further illustrates the blending tool 10 preventing for formation of air pockets 54 and vortex 56 that may inhibit or delay mixing of the substance 20. More specifically, the appendage 140, the contact body 160 and plurality of grasping tabs 170 improves the blending of the substance 20 within the blender container 32 by creating a non-laminar flow of the substance 20 within the blender container 32.

Preferably, the blender tool 10 may be constructed of a polymeric, metallic or other rigid material which is dishwasher safe that may be adequately sterilized inside and out. The blender tool 10 is constructed such that the primary body 60 and the secondary body 80 may be separated entirely for sterilizing inside and out. Furthermore the slip nut 110 and the slip washer 120 are also constructed such that they may be separated entirely for sterilizing. The blender tool 10 may be constructed of a food grade material that is US FDA approved for contact with an edible substance. For example, the blender tool 10 may be constructed of a polycarbonate, nylon or other US FDA approved materials.

The present disclosure includes that contained in the appended claims as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

What is claimed is:

1. A blender tool for assisting in blending a substance within a blender, the blender having a blender container for receiving the substance, a mixing blade positioned within the blending container for blending the substance, the blending tool, comprising:

a primary body extending between a proximal end and a distal end;

a handle coupled to said proximal end of said primary body;

a secondary body extending between a proximal end and a distal end;

said distal end of said primary body and said proximal end of said secondary body slidably engaging for defining a telescoping engagement;

said telescoping engagement providing a varying tool length;

a slip nut engaging said telescoping engagement for coupling said primary body to said secondary body and defining a fixed tool length;

an appendage extending outwardly from said secondary body for increasing the contact surface area between the secondary body and the substance and improving the blending of the substance within the blender container; and said varying tool length configured for maintaining a separation between said distal end of said secondary body and the mixing blade.

2. The blender tool as set forth in claim 1, further including a primary conical body coupling said primary body with said handle;
   said primary conical body defining an ascending decreasing cross-sectional area; and
   said handle and said primary conical body defining a circular gripping channel for increasing the gripping the area of the blender tool.

3. The blender tool as set forth in claim 1, further including a slip washer engaging with said telescoping engagement; and
   said slip nut compressing said slip washer into said telescoping engagement for preventing the substance from entering said primary body and said secondary body.

4. The blender tool as set forth in claim 1, further including a first descending stop tab and a second descending stop tap coupled to said slip nut;
   said first descending stop tab and said second descending stop tap assisting in applying a rotational force to said slip nut; and
   said first descending stop tab and said second descending stop tap contacting the blender container for terminating further descending displacement of the blender tool and preventing contact between said distal end of said secondary body and the mixing blade.

5. The blender tool as set forth in claim 1, wherein said appendage includes a plurality of elongated fins.

6. The blender tool as set forth in claim 1, wherein said appendage includes a plurality of elongated fins positioned equidistant around the circumference of said secondary body.

7. The blender tool as set forth in claim 1, wherein said appendage includes a plurality of elongated fins; and
   said plurality of fins having a concave shape for improving the blending of the substance within the blender container.

8. The blender tool as set forth in claim 1, wherein said secondary body defines a secondary body diameter;
   an upper secondary conical body in said secondary body;
   said upper secondary conical body defining a descending decreasing cross-sectional area;
   an extension body coupled to said upper secondary conical body;
   said extension body defining an extension body diameter;
   a lower secondary conical body coupled to said extension body;
   said lower secondary conical body defining a descending increasing cross-sectional area;
   said extension body diameter being less than said secondary body diameter for defining a circular recessed channel between said upper secondary conical body and said lower secondary conical body; and
   said appendage extending outwardly from said extension body and extending into said circular recessed channel.

9. The blender tool as set forth in claim 8, further including a contact body coupled to said lower secondary conical body;
   said contact body defining a contact body diameter; and
   said contact body diameter being greater than said extension body diameter for defining an contact knob for displacing the substance within the blender.

10. The blender tool as set forth in claim 1, further including a plurality of grasping tabs coupled to said distal end of said secondary body for entangling the substance with the blender tool and positioning in close proximity to the mixing blade.

11. The blender tool as set forth in claim 10, wherein said plurality of grasping tabs defining a grid orientation for entangling the substance within said plurality of grasping tabs.

12. A blender tool for assisting in blending a substance within a blender, the blender having a blender container for receiving the substance, a mixing blade positioned within the blending container for blending the substance, a lid engaging with the blending container; a lid aperture in the lid, the lid aperture having a lid aperture diameter, the blending tool, comprising:
   a primary body extending between a proximal end and a distal end;
   a handle coupled to said proximal end of said primary body;
   a secondary body extending between a proximal end and a distal end;
   said distal end of said primary body and said proximal end of said secondary body slidably engaging for defining a telescoping engagement;
   said telescoping engagement providing a varying tool length;
   a slip nut engaging said telescoping engagement for coupling said primary body to said secondary body and defining a fixed tool length;
   an appendage extending outwardly from said secondary body for increasing the contact surface area between the secondary body and the substance and improving the blending of the substance within the blender container;
   said varying tool length configured for maintaining a separation between said distal end of said secondary body and the mixing blade;
   said secondary body defining a secondary body diameter;
   said secondary body diameter being less than the lid aperture diameter for permitting said secondary body and said appendage to be inserted through the lid aperture and into the blender container;
   said slip nut defining a slip nut diameter; and
   said slip nut diameter being greater than the lid aperture diameter for contacting the lid and terminating further descending displacement of the blender tool and preventing contact between said distal end of said secondary body and the mixing blade.

13. The blender tool as set forth in claim 12, further including a primary conical body coupling said primary body with said handle;
   said primary conical body defining an ascending decreasing cross-sectional area; and
   said handle and said primary conical body defining a circular gripping channel for increasing the gripping the area of the blender tool.

14. The blender tool as set forth in claim 12, further including a slip washer engaging with said telescoping engagement; and
   said slip nut compressing said slip washer into said telescoping engagement for preventing the substance from entering said primary body and said secondary body.

15. The blender tool as set forth in claim 12, further including a first descending stop tab and a second descending stop tap coupled to said slip nut;
   said first descending stop tab and said second descending stop tap assisting in applying a rotational force to said slip nut; and
   said first descending stop tab and said second descending stop tap contacting the lid for terminating further descending displacement of the blender tool and preventing contact between said distal end of said secondary body and the mixing blade.

16. The blender tool as set forth in claim 12, wherein said appendage includes a plurality of elongated fins.

17. The blender tool as set forth in claim 12, wherein said appendage includes a plurality of elongated fins positioned equidistant around the circumference of said secondary body.

18. The blender tool as set forth in claim 12, wherein said appendage includes a plurality of elongated fins; and
   said plurality of fins having a concave shape for improving the blending of the substance within the blender container.

19. The blender tool as set forth in claim 12, further including an upper
   secondary conical body in said secondary body;
   said upper secondary conical body defining a descending decreasing cross-sectional area;
   an extension body coupled to said upper secondary conical body;
   said extension body defining an extension body diameter;
   a lower secondary conical body coupled to said extension body;
   said lower secondary conical body defining a descending increasing cross-sectional area;
   said extension body diameter being less than said secondary body diameter for defining a circular recessed channel between said upper secondary conical body and said lower secondary conical body;
   said appendage extending outwardly from said extension body and extending into said circular recessed channel;
   said extension body and said appendage defining an appendage diameter; and
   said appendage diameter being less than the lid aperture diameter for permitting said secondary body and said appendage to be inserted through the lid aperture and into the blender container.

20. The blender tool as set forth in claim 19, further including a contact body coupled to said lower secondary conical body;
   said contact body defining a contact body diameter;
   said contact body diameter being greater than said extension body diameter for defining an contact knob for displacing the substance within the blender; and
   said contact body diameter being less than the lid aperture diameter for permitting said secondary body and said contact knob to be inserted through the lid aperture and into the blender container.

21. The blender tool as set forth in claim 12, further including a plurality of grasping tabs coupled to said distal end of said secondary body for entangling the substance with the blender tool and positioning in close proximity to the mixing blade.

22. The blender tool as set forth in claim 21, wherein said plurality of grasping tabs defining a grid orientation for entangling the substance within said plurality of grasping tabs.

23. The blender tool as set forth in claim 12, further including a recess groove in said secondary body for aligning with the lid aperture; and
   said recess groove configured for laterally displacing said handle relative to the lid and producing a lateral displacement of said distal end of said secondary body within the blender container for assisting in blending the substance within the blender container.

24. A blender tool for assisting in blending a substance within a blender, the blender having a blender container for receiving the substance, a mixing blade positioned within the blending container for blending the substance, a lid engaging with the blending container; a lid aperture in the lid, the lid aperture having a lid aperture diameter, the blending tool, comprising:
   a primary body extending between a proximal end and a distal end;
   a handle coupled to said proximal end of said primary body;
   a secondary body extending between a proximal end and a distal end;
   said distal end of said primary body and said proximal end of said secondary body slidably engaging for defining a telescoping engagement;
   said telescoping engagement providing a varying tool length;
   a slip nut engaging said telescoping engagement for coupling said primary body to said secondary body and defining a fixed tool length;
   an appendage extending outwardly from said secondary body for increasing the contact surface area between the secondary body and the substance and improving the blending of the substance within the blender container;
   said varying tool length configured for maintaining a separation between said distal end of said secondary body and the mixing blade;
   said secondary body defining a secondary body diameter;
   said secondary body diameter being less than the lid aperture diameter for permitting said secondary body and said appendage to be inserted through the lid aperture and into the blender container;
   said slip nut defining a slip nut diameter;
   said slip nut diameter being greater than the lid aperture diameter for contacting the lid and terminating further descending displacement of the blender tool and preventing contact between said distal end of said secondary body and the mixing blade;
   a slip washer engaging with said telescoping engagement;
   said slip nut compressing said slip washer into said telescoping engagement for preventing the substance from entering said primary body and said secondary body; and
   said appendage includes a plurality of elongated fins.

* * * * *